United States Patent [19]
Newell

[11] Patent Number: 5,702,142
[45] Date of Patent: Dec. 30, 1997

[54] TRAUMA UNIT FOR VEHICLE

[76] Inventor: Arthur E. Newell, 500 Danbury La., Topeka, Kans. 66606

[21] Appl. No.: 556,223

[22] Filed: Nov. 9, 1995

[51] Int. Cl.⁶ .................................................. A61G 3/00
[52] U.S. Cl. ........................................................ 296/19
[58] Field of Search ................................... 296/19, 20

[56] References Cited

U.S. PATENT DOCUMENTS

| | | | |
|---|---|---|---|
| 2,161,541 | 6/1939 | Tintner | 296/19 |
| 2,314,419 | 3/1943 | Olson | 296/19 |
| 2,387,186 | 10/1945 | Schofield | 296/19 |
| 2,520,128 | 8/1950 | Cushman | 296/19 |
| 5,012,880 | 5/1991 | Abner | 296/19 X |
| 5,509,710 | 4/1996 | Eavenson, Sr. et al. | 296/19 |

*Primary Examiner*—Andrew C. Pike
*Attorney, Agent, or Firm*—Litman, McMahon and Brown, L.L.C.

[57] ABSTRACT

A trauma unit for transporting nonambulatory patients includes a removable frame secured to a vehicle by a frame mounting system which includes a series of mounting subassemblies, hooks, and studs. The trauma unit frame supports a variety of patient/attendant support systems including patient and attendant seats, straps, fasteners, and patient-immobilizing apparatus such as a patient-immobilizing panel and an adjustable, retractable leg splint.

23 Claims, 6 Drawing Sheets

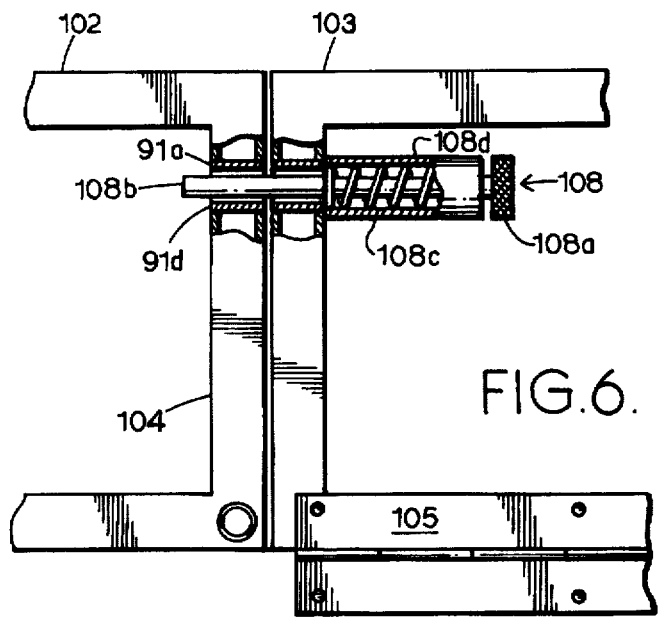
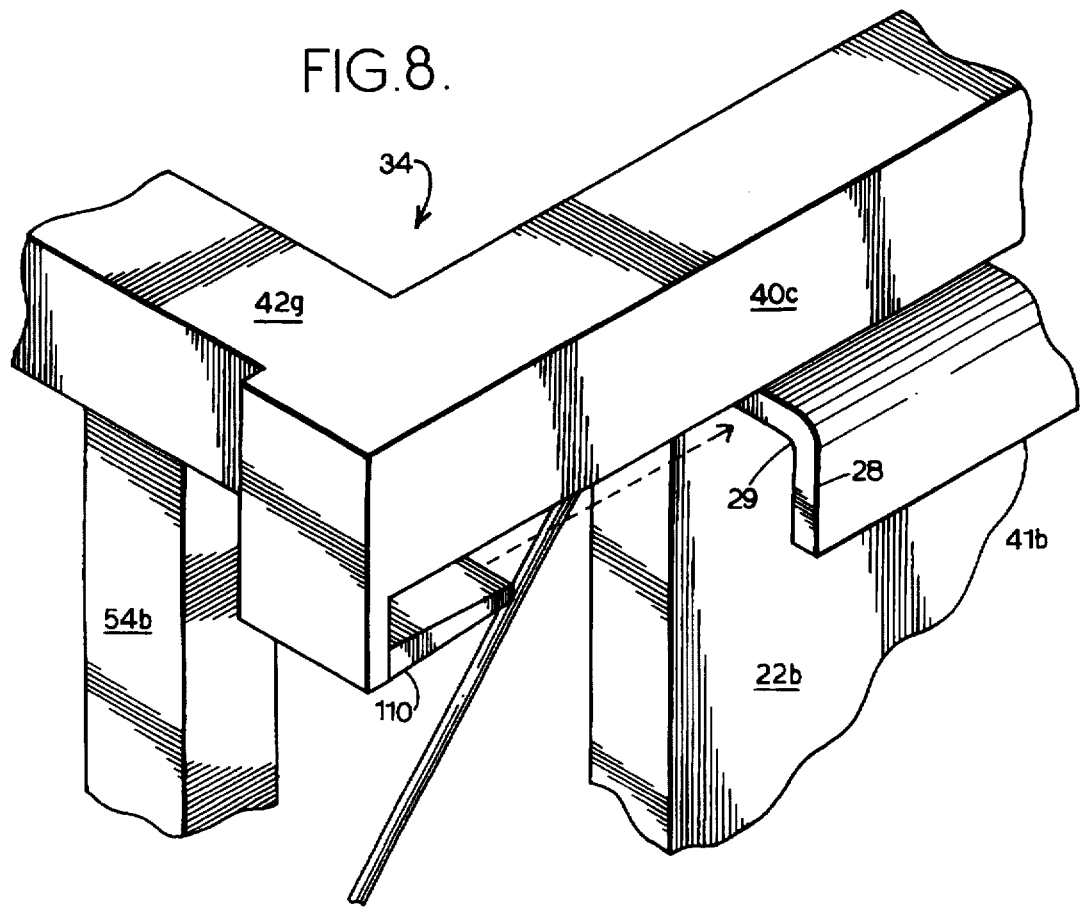

TRAUMA UNIT FOR VEHICLE

BACKGROUND OF THE INVENTION

1. Field of the Invention

The present invention relates generally to equipment for transporting patients, and in particular to a trauma unit adapted for mounting on a vehicle for evacuating injured players from a playing field or other injury site.

2. Description of the Prior Art

Evacuation of injured persons from injury sites to medical treatment facilities involves various considerations, including safety and timing. For example, the effective treatment of many types of injuries requires immobilizing the patient to avoid further injury. Spinal and head injuries in particular are susceptible to exacerbation from post-injury misalignment, trauma, etc. For this reason traumatic accident victims are often placed on a backboard and fitted with a cervical collar prior to evacuation.

Previous injury victim evacuation systems have ranged from simple, collapsible stretchers for use by a pair of stretcher bearers to aircraft used as air ambulances for transporting accident victims to hospitals. Within this range of medical evacuation equipment types are various vehicles designed for transporting patients, including ambulances and the like. However, conventional ambulances are difficult to utilize at certain types of accident sites. For example, athletic playing fields present medical evacuation problems which are not well addressed by conventional ambulances. The turf playing surfaces are susceptible to damage from large vehicles, and considerations of space and access often preclude the use of conventional ambulances for medical evacuation from athletic playing fields. Moreover, fully-equipped ambulances are relatively expensive and would thus be cost-prohibitive for use as the initial medical evacuation equipment at many sports venues.

Field maintenance vehicles are commonly available at many athletic fields and are typically designed for driving directly onto the fields without damaging the turf. Such vehicles are typically characterized by relatively large tires mounted on relatively small vehicles for reducing the pressure per unit area imposed by the vehicles on turf surfaces. Such vehicles are commonly used for maintenance operations in connection with athletic playing fields, golf courses, parks, and other sodded areas. Although such vehicles are in use at many sports facilities, most are not adapted for transporting accident victims, particularly accident victims which are unconscious or which require immobilization.

In most organized sporting events considerable emphasis is placed on player safety. Typical precautions include protective gear and rules which are intended to reduce the risk of injury. Notwithstanding such precautions, various sports activities can result in player injuries. For example, contact sports, such as football, tend to produce injuries associated with impacts which can render the victims non-ambulatory and in need of evacuation from a playing field.

It is also not uncommon in sports contests for players to be rendered unconscious and thus in need of prompt medical evacuation in an immobilized condition to reduce the risk of further injury. Yet another consideration in sports contests relates to the necessity of evacuating injured players as quickly as possible, both for purposes of obtaining prompt medical attention and for purposes of minimizing the disruption of game play.

Heretofore there has not been available a trauma unit for a vehicle which combines the advantages and features of the present invention, particularly by utilizing readily available maintenance equipment which can be readily adapted for medical evacuation purposes with a trauma unit according to the present invention.

SUMMARY OF THE INVENTION

The present invention is directed to a trauma unit for removably mounting on a vehicle with a bed, a driver/passenger area, a body, and a tailgate, for evacuating an injured athlete from a sports field or other location. The unit includes a frame removably attached to the vehicle via a frame mounting system comprising a series of mounting subassemblies, hooks and studs for attaching the frame to various locations on the vehicle body. The frame supports a patient attendant support system necessary for the safe transport of injured persons and attendants including an immobilizing panel (e.g., a backboard), a front attendant seat, a side attendant seat, and a patient back seat with an adjustable, retractable leg splint. The vehicle also includes cargo shields mounted on the upper edge of the bed front wall to impede cargo objects from striking occupants. The cargo shields function in a deployed position by extending upwardly from the bed front wall upper edge. The driver side cargo shield is secured in a fixed position extending upwardly, while the passenger side cargo shield is hingedly mounted on the bed front wall upper edge allowing it to be lowered in order to facilitate mounting of the trauma unit frame. A spring loaded latch secures the driver and passenger side cargo shields together in the deployed position.

The trauma unit of the present invention is capable of being removably mounted on a vehicle and allowing the vehicle to be used as a patient transport unit during a sporting event and allowing for conversion back to a utility vehicle when the trauma unit is not needed.

OBJECTS AND ADVANTAGES OF THE INVENTION

The principle objects and advantages of the present invention include: providing a trauma unit for a vehicle; providing such a trauma unit which is removable from the vehicle allowing the vehicle to be used for other purposes; providing a vehicle suited for quick response to emergency medical needs; providing a vehicle for transporting nonambulatory patients; providing a vehicle with accommodation areas for patients and medical attendants; and providing a trauma unit for immobilizing and transporting persons with various injuries including spinal and leg injuries.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is an enlarged, fragmentary view taken generally along line 6—6 in FIG. 1.

FIG. 8 is an enlarged, fragmentary view illustrating a hook connection of a frame back corner to the vehicle bed.

DETAILED DESCRIPTION OF THE PREFERRED EMBODIMENTS

I. Introduction and Environment

Figure 1:
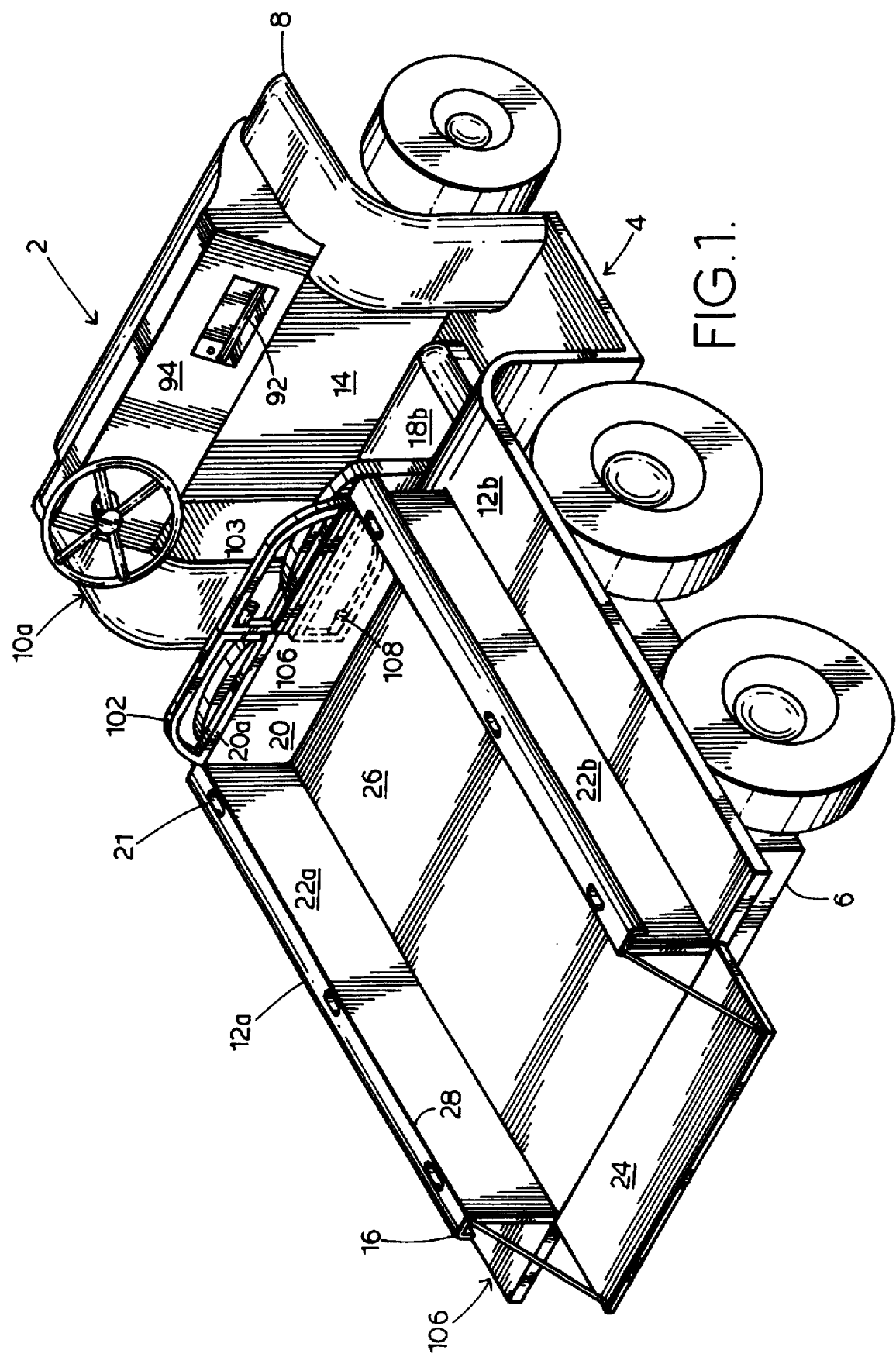
FIG. 1 is a perspective view of a vehicle which can mount a trauma unit embodying the present invention. A fixed driver side cargo shield and a hinged passenger side cargo shield are shown a first, deployed position in solid lines and in a second, folded position in broken lines.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and, words of a similar import.

Referring to the drawings in more detail, the reference numeral 2 generally designates a trauma unit embodying the present invention. Without limitation on the generality of useful applications of the trauma unit 2, it is disclosed herein mounted on a vehicle 4 (FIG. 1) including a chassis 6 and a body 8. The vehicle body 8 includes front and back ends 10a, 10b; driver and passenger sides 12a, 12b, and a driver/passenger area 14 located in proximity to the vehicle front end 10a.

The body 8 includes a bed 16 which includes a front wall 20 with an upper edge 20a, opposite driver and passenger sidewalls 22a, 22b, a tailgate 24, and a bed floor 26. The bed is generally upwardly open with an upper rim 28. The tailgate has a down/open position as shown and an up/closed position (not shown). Without limitation on the generality of useful vehicles for mounting the trauma unit 2, the vehicle 4 can comprise, for example, a utility vehicle available from the John Deere Company of Moline, Illinois under the trademark "GATOR". The trauma unit 2 could be adapted to a wide variety of other open-back vehicles, including, for example, golf carts, pickup trucks, trailers, etc.

Figure 3:
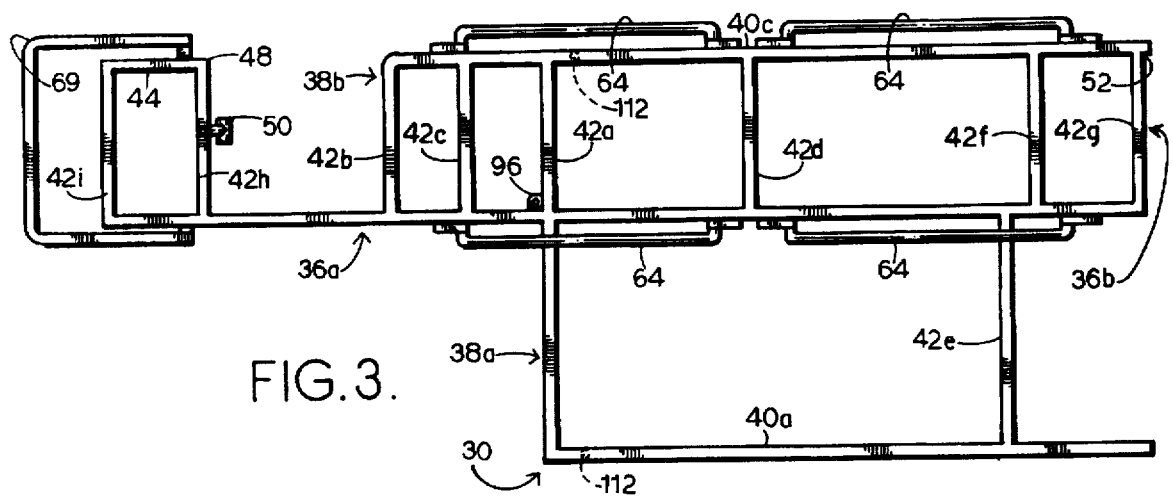
FIG. 3 is a top plan view of a frame of a trauma unit with broken lines illustrating the position of studs extending from the bottom side of the trauma unit frame.

The trauma unit 2 (FIG. 3) generally comprises a frame 30, a patient/attendant support system 32, and a frame mounting system 34.

II. Frame 30

The frame 30 includes front and back ends 36a, 36b and opposite driver and passenger sides 38a, 38b. The frame 30 includes driver side, intermediate and passenger side longitudinal members 40a, 40b, 40c extending longitudinally with respect to the longitudinal axis of the vehicle 4. Driver and passenger side longitudinal members 40a, 40c include bottom edges 41a, 41b. Studs 112 depend downwardly from the bottom edges 41a, 41b and are received in the vehicle stakeholes 21. The intermediate longitudinal member 40b extends generally the length of the frame 30 between its front and back ends 36a, 36b. The side longitudinal members 40a, 40c extend forwardly from the frame back end 36b and terminate in proximity to the driver/passenger area 14 to provide access thereto from either side.

Figure 2:
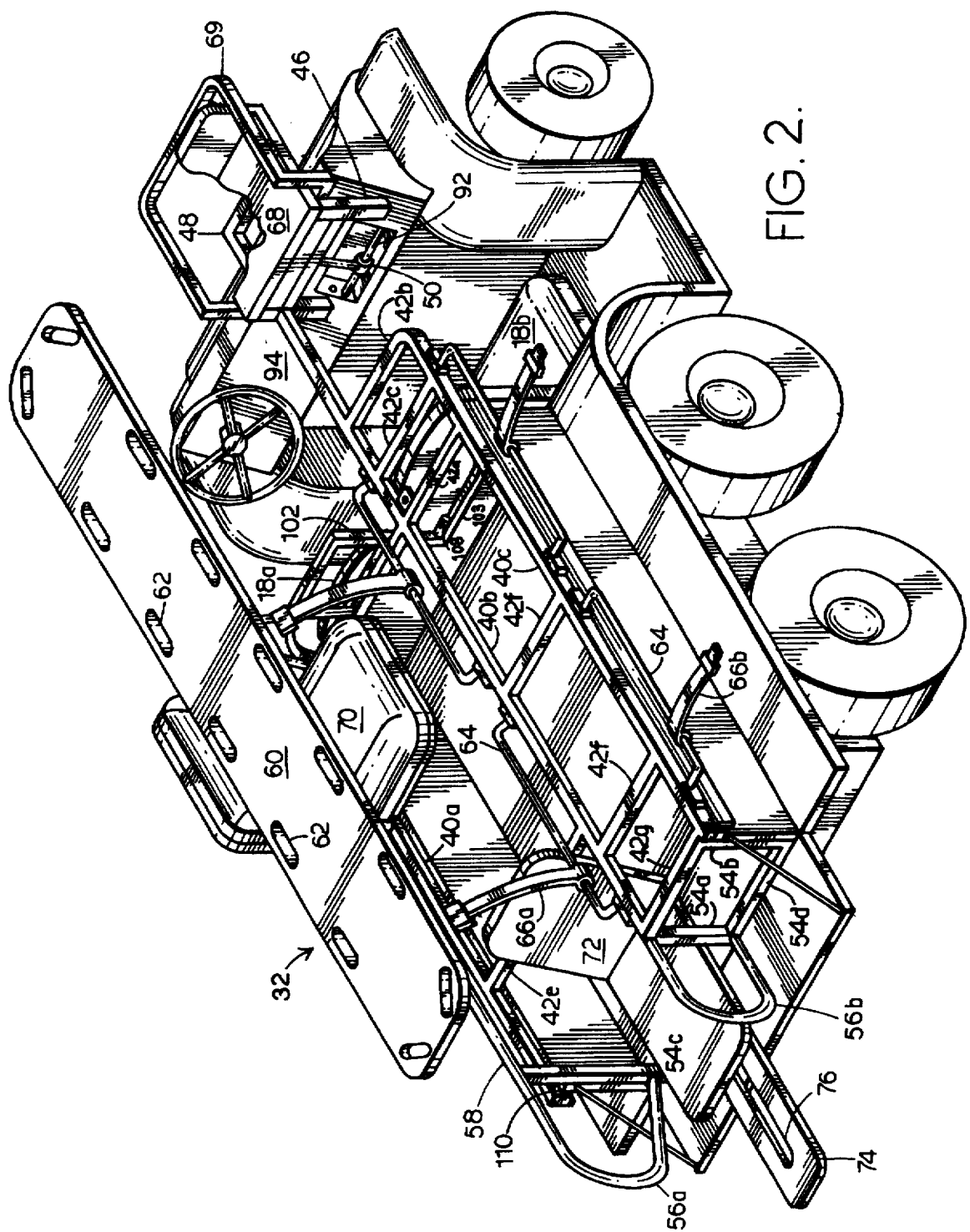
FIG. 2 is an exploded perspective view of the vehicle mounted with the trauma unit including a patient immobilizing panel removed from its transporting position.

A main crosspiece 42a extends transversely between the side longitudinal members 40a, 40c and connects the intermediate longitudinal member 40b. Multiple passenger side crosspieces 42b, 42c, 42d, 42f, and 42g extend between the intermediate and passenger side longitudinal members 40b, 40c. A pair of front crosspieces 42h and 42i extend (FIG. 3) between the intermediate longitudinal member 40b and a front seat frame outside member 44 and a pair of front seat frame posts 46 (FIG. 2) to form a front seat subframe 48. A support rail 69 is mounted on the front seat front seat subframe 48.

A back subframe 52 includes intermediate and passenger side posts 54a, 54b respectively connected to the back ends of the longitudinal members 40b and 40c. A back subframe lower crosspiece 54d connects the lower ends of the back subframe. A driver side back handrail 56a extends rearwardly from a driver side subframe post 54c and an intermediate back handrail 56b extends rearwardly from the intermediate back subframe post 54a.

The driver side subframe post 54c protrudes upwardly from the level of the driver side longitudinal member 40a and mounts a driver side rail 58 which extends slightly above and in parallel relation to the driver side longitudinal member 40a and connects to the driver side back handrail 56a.

A driver side intermediate crosspiece 42e connects between the driver side longitudinal member 40a and the intermediate longitudinal member 40b.

A clevis 50 extends downwardly from the front seat subframe 48 and is secured to a passenger grab bar 92 mounted on a dash 94 of the vehicle 4.

III. Patient/Attendant Support System 32

Figure 4:
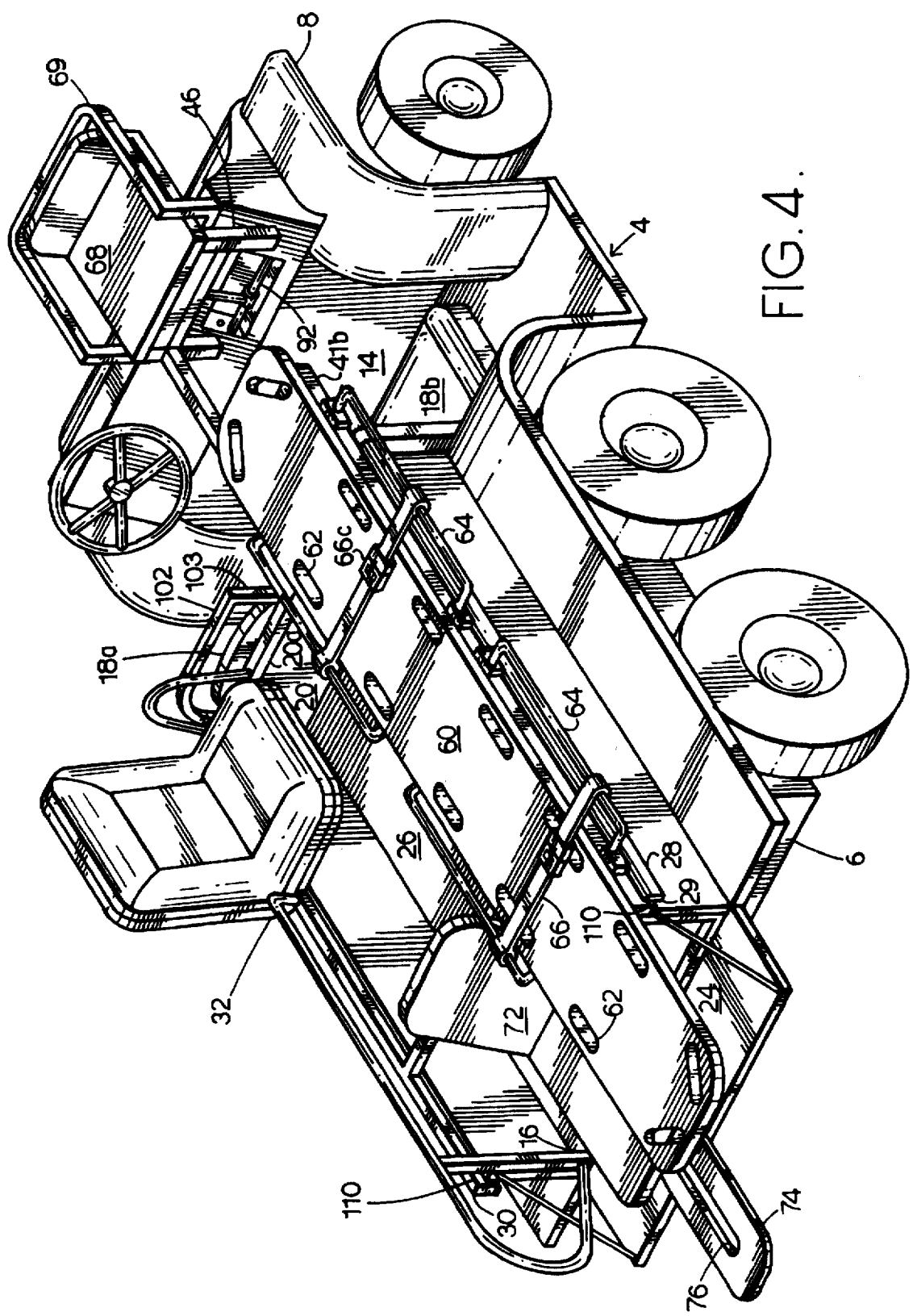
FIG. 4 is a perspective view of a vehicle mounted with a trauma unit illustrating a patient immobilizing panel secured in its the transport position with straps, and a leg splint extended rearwardly from the patient back seat.
Figure 5:
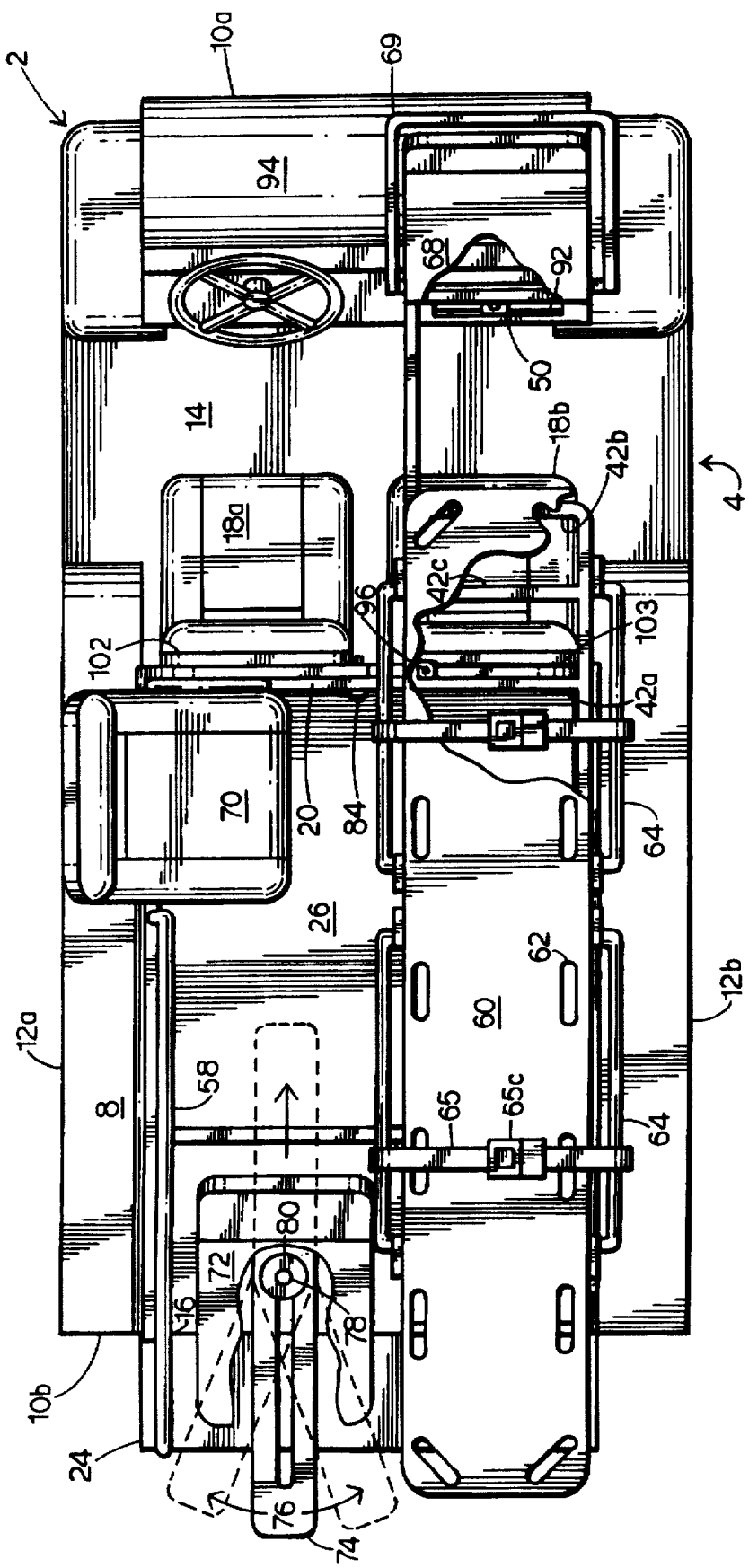
FIG. 5 is a top plan view of a vehicle mounted with a trauma unit including a rearwardly facing patient seat with an adjustable leg immobilizing means, a patient immobilizing panel secured in the transporting position with straps, and a front attendant seat broken away to illustrate placement of a front mounting subassembly.

The patient/attendant support system 32 (FIGS. 2, 4, and 5) includes a patient immobilizing panel 60 with multiple cutout hand grips 62. The patient immobilizing panel 60 is of a type which is commonly used for immobilizing individuals with suspected spinal injuries, and due to its relative rigidity tends to provide support in a manner which reduces risk of further injury to a patient placed thereon.

Front and back pairs of grab bars 64 are mounted on the intermediate and passenger side longitudinal members 40b, 40c and project towards the vehicle driver side 12a and the passenger side 12b respectively. Each pair of grab bars 64 mounts a respective inside or outside strap portion 66a, 66b which can be secured by buckles 66c to form front and back straps 66 for securing the patient immobilizing panel 60 and a patient thereon to the frame 30 in supported relation on the intermediate and passenger side longitudinal members 40b, 40c and on the passenger side crosspieces 42b, 42c, 42d, 42f, and 42g.

Various arrangements of straps and other fasteners could be used to: (a) secure a patient to the immobilizing panel 60; and (b) secure the immobilizing panel 60 to the frame 30. A cervical collar (not shown) can be placed on the front end of the patient immobilizing panel 60 for immobilizing a patient's head and neck area.

A front attendant seat 68 generally within the support rail 69 is mounted on the front seat subframe 48 and faces rearwardly whereby an attendant seated thereon can place his or her legs in the driver/passenger area 14. The passenger seat 18b can be left in place to provide a foot rest for the front attendant seat 68, or can be removed to provide more room in the driver/passenger area 14.

A side attendant seat 70 is mounted on the driver's side longitudinal member 40a for seating by an attendant behind the driver/passenger area 14 and facing inwardly, i.e., towards the patient immobilizing panel 60.

A patient back seat 72 is positioned adjacent the back crosspiece 42e and is particularly adapted for use by a patient with a suspected leg (e.g., knee, ankle, or foot) injury. A retractable splint 74 includes a slot 76 and is mounted to the trauma unit 2 by a mechanical fastener 78 extending through the slot 76 and mounting a washer 80 whereby the splint 74 is adapted to rotate from side-to-side as shown in dashed lines in FIG. 5. The splint 74 is thus adapted to support either leg or a patient seated on the back seat 72 by rotating it from one side to the other. The splint 74 is retractable to a position as shown by dashed lines in FIG. 5 for placement out-of-the-way when not in use.

IV. Frame Mounting System 34

Figure 7:
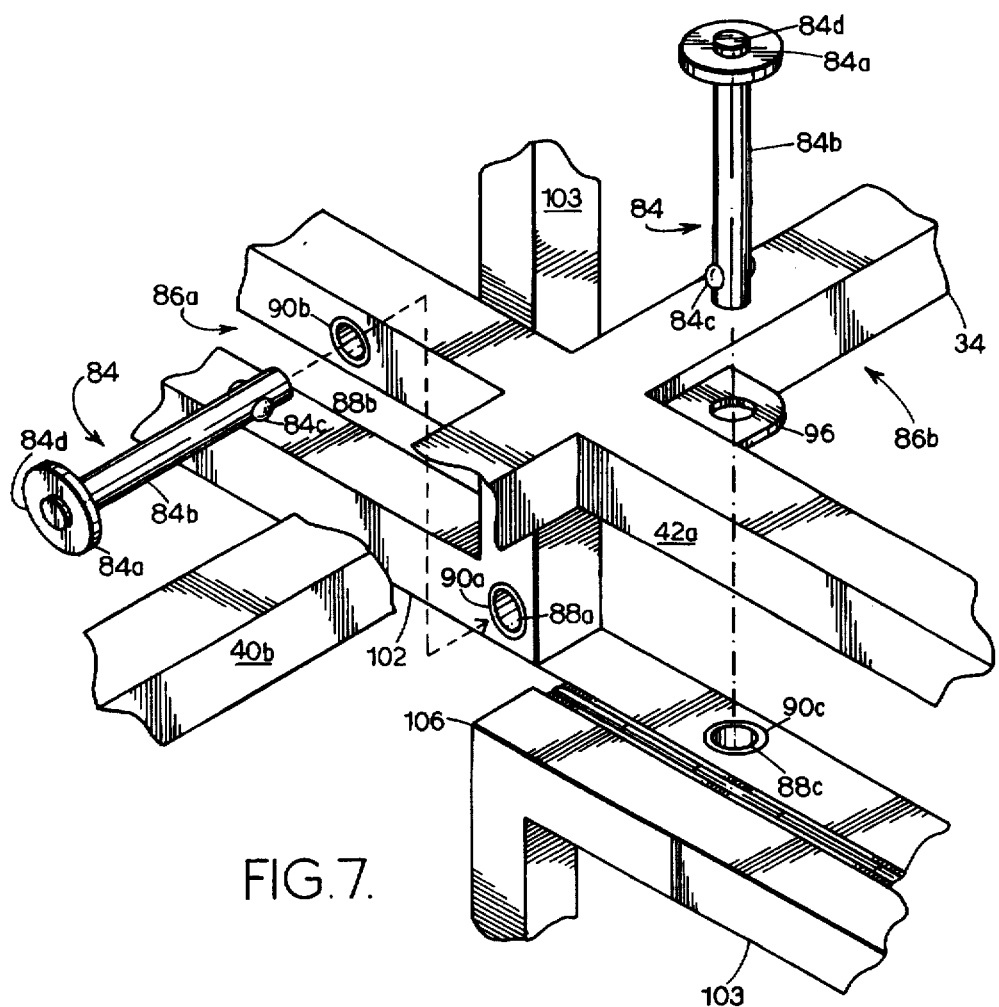
FIG. 7 is an enlarged, fragmentary view illustrating connection of the frame to the cargo shields and the vehicle bed.

The frame mounting system 34 (FIGS. 7 and 8) includes mounting subassemblies 86a, 86b, 86c, hooks 110 and studs 112 for mounting the frame 30 on vehicle 4. First intermediate and second intermediate mounting subassemblies 86a, 86b, each includes a lock pin 84 comprising a knob 84a, a shank 84b, a ball detent 84c, and a button actuator 84d. Each ball detent 84c is retracted by recessing the respective button actuator 84d and is released from the retracted position to an extended position by releasing the button actuator 84d.

The first intermediate mounting subassembly 86a includes a lock pin received by a first sleeve 88a located in a receiver 90a in a fixed cargo shield vertical member 107 and a second sleeve 88b located in a receiver 90b in the frame main crosspiece 42a.

The second intermediate mounting subassembly 86b includes a lock pin 84 received by a gusset 96 fixed to the main crosspiece 42a and the intermediate longitudinal member 40b and a sleeve 88c located in the upper edge 20a of the bed front wall 20.

Hooks 110 positioned at the bottom back edge of the driver and passenger side longitudinal members 40a, 40c are received in a channel 29 vertically positioned under the bed upper rim 28. The hooks 110 taper towards the front of the vehicle bed 16 and slope downwardly from back to front. Studs 112 protrude from the driver and passenger side frame bottom edges 41a and 41b are received in vehicle stakeholes 21.

V. Cargo Shields 102

Vehicles such as the vehicle designated 4 are often provided with beds 16 having front walls 20 which extend upwardly above the level of the upper edges of the other bed walls to provide protection for occupants of the vehicle 4 from shifting cargo within the bed 16. For example, if the vehicle were to stop suddenly, objects in the vehicle bed 16 would thus be prevented from striking the driver and/or passenger.

The bed front wall 20 can be modified for use with the present invention by providing a pair of cargo shields, a driver side fixed cargo shield 102 and a passenger side hingedly mounted cargo shield 103, which can be mounted on the bed front wall adjacent to the passenger side 12b by a piano hinge 105 which attaches to an upper edge 20a of the bed front wall 20 and to a proximate edge 106 (FIG. 1) of the hinged cargo shield 103 for hingedly mounting same. The hinge 105 permits swinging the cargo shield 103 rearwardly and downwardly to a stored, out-of-the-way position as shown in broken lines in FIG. 1 whereby the frame 30 can be placed thereon. The vertically deployed hinged cargo shield 103 extends upwardly from the bed front wall upper edge 20a.

A spring loaded latch 108 is secured to the hinged cargo shield 103. The latch 108 comprises a knob 108a, a plunger 108b, a housing 108c, and a helical spring 108d. The fixed cargo shield 102 includes a receiver 91a with a sleeve 91d extending therethrough for selectively receiving the plunger 108b of a spring loaded latch 108.

It is to be understood that while certain forms of the present invention have been illustrated and described herein, it is not to be limited to the specific forms or arrangement of parts described and shown.

I claim:

1. A trauma unit for mounting on a vehicle including front and back ends, a driver/passenger area located in proximity to the front end, and a bed extending between the driver/passenger area and the vehicle back end, wherein said trauma unit comprises:

(a) a frame adapted to overlie the bed and having front and back ends and opposite driver and passenger sides;

(b) said frame having a patient-immobilizing-panel support portion located along a respective said side of the frame;

(c) at least one hook on said frame positioned to engage a rear portion of said vehicle; and (d) at least one pin engageable with said frame and removably engageable with a sleeve attached to said vehicle when said hook is engaged with said vehicle rear portion.

2. The trauma unit according to claim 1, wherein:

(a) said support portion is located along the passenger side of said frame.

3. The trauma unit according to claim 1 wherein said support portion comprises:

(a) a passenger side longitudinal member and an intermediate longitudinal member each extending generally longitudinally with respect to said frame; and (b) a plurality of crosspieces extending between said passenger side and intermediate longitudinal members.

4. The trauma unit according to claim 3, which further includes:

(a) a plurality of straps attached to said passenger side longitudinal member and said intermediate longitudinal member for securing a patient-immobilizing panel on said support portion.

5. The trauma unit according to claim 1, which further includes:

(a) a patient seat mounted on said frame adjacent to the driver side and the back end thereof, said patient seat facing rearwardly.

6. The trauma unit according to claim 1, which further includes:

(a) a front attendant seat mounted on said frame front end in front of said vehicle driver/passenger area, said front attendant seat facing rearwardly.

7. The trauma unit according to claim 1, which further includes:
   (a) a side attendant seat mounted on said frame adjacent to the driver side thereof.
8. The trauma unit according to claim 1, wherein:
   (a) said bed has a front wall with an upper edge; and
   (b) said trauma unit further includes driver and passenger side cargo shields for shielding occupants of the vehicle from cargo in the vehicle bed, said driver side cargo shield being fixed, said passenger side cargo shield having a first position extending upwardly from said front wall upper edge and a second position folded downward alongside said front wall.
9. A trauma unit for mounting on a vehicle including front and back ends, a driver/passenger area located in proximity to the front end, and a bed extending between the driver/passenger area to the vehicle back end, wherein said trauma unit comprises:
   (a) a frame including:
      (1) front and back ends and driver and passenger sides;
      (2) a driver side longitudinal member and a passenger side longitudinal member extending along said driver and passenger sides respectively;
      (3) an intermediate longitudinal member extending longitudinally in spaced relation between said driver and passenger side longitudinal members; and
      (4) at least one crosspiece extending transversely between and connecting said longitudinal members;
   (b) a patient/attendant support system comprising:
      (1) panel mounting means for mounting a patient-immobilizing panel on said frame;
      (2) a patient seat mounted on said frame adjacent to the driver side and the back end thereof;
      (3) a front attendant seat mounted on said frame adjacent the front end thereof in front of said driver/passenger area; and
      (4) a side attendant seat mounted on said frame adjacent the driver side; and
   (c) frame mounting means for selectively and removably mounting said frame on said vehicle.
10. The trauma unit according to claim 9, wherein said panel mounting means includes:
    (a) a plurality of straps with each said strap attached to a respective one of said passenger side longitudinal member and said intermediate longitudinal member.
11. The trauma unit according to claim 9, which further includes: (a) leg immobilizing means extending rearwardly from said frame back end at said patient seat for immobilizing a leg of a patient seated thereon in an extended position, wherein said leg immobilizing means comprises:
    (1) a slidably extendable leg board slidable between a retracted position substantially under said patient seat and an extended position extending rearwardly from said frame back end;
    (2) a longitudinally extending slot; and
    (3) a leg board mounting bolt which extends through said leg board slot and pivotably mounts said leg board on said trauma unit.
12. The trauma unit according to claim 9 wherein said frame mounting means comprises:
    (a) a clevis;
    (b) a first intermediate mounting subassembly which includes a lock pin and sleeves;
    (c) a second intermediate mounting subassembly which includes a lock pin, a gusset, and a sleeve;
    (d) at least one hook; and
    (e) studs positioned to engage respective stake pockets on the vehicle.
13. The trauma unit according to claim 12, wherein each of said lock pins include:
    (a) a knob;
    (b) a shank;
    (c) a ball detent; and
    (d) a button actuator.
14. A trauma unit for a vehicle including a chassis and a vehicle body, the vehicle body having front and back ends, driver and passenger sides, a driver/passenger area in proximity to the front end, and a bed with bed sidewalls, a bed front wall, and a tailgate, wherein said trauma unit comprises:
    (a) a frame including:
       (1) front and back ends;
       (2) driver and passenger sides;
       (3) a driver side longitudinal member extending longitudinally adjacent said frame driver side;
       (4) a passenger side longitudinal member extending generally longitudinally along said frame passenger side;
       (5) a frame intermediate longitudinal member extending longitudinally between said frame front and back ends in spaced relation between and generally parallel to said driver and said passenger side longitudinal members;
       (6) a main crosspiece extending transversely between said driver and said passenger said longitudinal members and connected to said intermediate longitudinal member;
       (7) a plurality of side crosspieces extending transversely between said intermediate longitudinal member and said passenger side longitudinal member;
       (8) a front subframe including a front crosspiece extending transversely between said intermediate longitudinal member and said frame passenger side and a front handrail extending upwardly from said front crosspiece;
       (9) a rear subframe including a lower crosspiece extending between said frame passenger side and a position beneath said intermediate longitudinal member, a driver side post extending downward from said driver side longitudinal member, and passenger side and intermediate posts each extending downward between respective said passenger side and intermediate longitudinal members and respective ends of said lower crosspiece;
       (10) a driver side handrail extending rearwardly from said driver side post;
       (11) a driver side rail positioned over said driver side longitudinal member and extending longitudinally along said driver side of said frame; and
       (12) an intermediate handrail extending rearwardly from said intermediate post;
    (b) a patient-immobilizing panel including front and back ends, opposite sides, and a plurality of hand holds located in proximity to said panel opposite sides;
    (c) front and back pairs of frame handle extensions, each pair extending oppositely and laterally from respective said passenger side and intermediate longitudinal members;
    (d) front and back straps each comprising first and second strap sections connected to said frame handle extension pairs and adapted for selective interconnection, each said strap including buckle means for placement over said patient-immobilizing panel;

(e) a patient seat mounted on said frame in proximity to said frame back end and said frame driver side;

(f) a leg restraint board slidably connected to said frame beneath said patient seat and having a retracted position substantially under said patient seat and an extended position extending rearwardly, said leg restraint board being slidably movable between the retracted and extended positions thereof;

(g) a front attendant seat mounted on said front subframe in proximity to said frame front end and said frame passenger side;

(h) a side attendant seat mounted on said driver side longitudinal member; and (i) a frame mounting system including a plurality of sleeves in said frame and a like plurality of sleeves attached to said vehicle body and a corresponding plurality of fasteners, each fastener including a lock pin with a shank, a knob, a ball detent, and a button actuator.

15. A trauma unit for mounting on a vehicle including front and back ends, a driver/passenger area located in proximity to the front end, and a bed extending between the driver/passenger area and the vehicle back end, wherein said trauma unit comprises:

(a) a frame adapted to overlie the bed and having front and back ends and opposite driver and passenger sides;

(b) said frame having a patient-immobilizing-panel support portion located along a respective said side of the frame;

(c) frame mounting means for mounting said frame on said vehicle bed; and (d) a patient seat mounted on said frame adjacent to the driver side and the back end thereof, said patient seat facing rearwardly.

16. The trauma unit according to claim 15, which further includes:

(a) leg immobilizing means extending rearwardly from said frame back end at said patient seat for immobilizing a leg of a patient seated thereon in an extended position.

17. The trauma unit according to claim 16 wherein said leg immobilizing means comprises:

(a) a slidably extendable leg board slidable between a retracted position substantially under said patient seat and an extended position extending rearwardly from said frame back end.

18. The trauma unit according to claim 17 wherein:

(a) said leg board has a longitudinally extending slot; and (b) said trauma unit further includes a leg board mounting bolt which extends through said leg board slot and pivotably mounts said leg board on said trauma unit.

19. A trauma unit for mounting on a vehicle including front and back ends, a driver/passenger area located in proximity to the front end, and a bed extending between the driver/passenger area and the vehicle back end, wherein said trauma unit comprises:

(a) a frame adapted to overlie the bed and having front and back ends and opposite driver and passenger sides;

(b) said frame having a patient-immobilizing-panel support portion located along a respective said side of the frame;

(c) frame mounting means for mounting said frame on said vehicle bed; and (d) a front attendant seat mounted on said frame front end in front of said vehicle driver/passenger area, said front attendant seat facing rearwardly.

20. A trauma unit for mounting on a vehicle including front and back ends, a driver/passenger area located in proximity to the front end, and a bed extending between the driver/passenger area and the vehicle back end, wherein said trauma unit comprises:

(a) a frame adapted to overlie the bed and having front and back ends and opposite driver and passenger sides;

(b) said frame having a patient-immobilizing-panel support portion located along a respective said side of the frame; and (c) frame mounting means for mounting said frame on said vehicle bed, said frame mounting means comprising:

i) a clevis;

ii) a first intermediate mounting subassembly which includes a lock pin and sleeves;

iii) a second intermediate mounting subassembly which includes a lock pin, a gusset, and a sleeve;

iv) at least one hook positioned to engage a corresponding portion of the vehicle; and v) studs positioned to engage corresponding stake pockets in the vehicle.

21. The trauma unit according to claim 20, wherein each of said lock pins includes:

(a) a knob;

(b) a shank;

(c) a ball detent; and (d) a button actuator.

22. A trauma unit for mounting on a vehicle including front and back ends, a driver/passenger area located in proximity to the front end, and a bed extending between the driver/passenger area and the vehicle back end, said bed having a front wall with an upper edge, wherein said trauma unit comprises:

(a) a frame adapted to overlie the bed and having front and back ends and opposite driver and passenger sides;

(b) said frame having a patient-immobilizing-panel support portion located along a respective said side of the frame;

(c) frame mounting means for mounting said frame on said vehicle bed; and (d) driver and passenger side cargo shields, said driver side cargo shield being fixed, said passenger side cargo shield having a first position extending upwardly from said front wall upper edge and a second position folded into said vehicle bed.

23. The trauma unit according to claim 22 wherein said passenger side cargo shield includes:

(a) a hinge hingedly mounting said passenger side cargo shield on said bed front wall; and (b) a latch for selectively securing said passenger side cargo shield in the first position thereof.

* * * * *